United States Patent [19]

Roberts

[11] Patent Number: 4,699,453

[45] Date of Patent: Oct. 13, 1987

[54] MONOLITHIC FIBER OPTIC COUPLER HAVING TOTAL INTERNAL REFLECTING SURFACE

[75] Inventor: Harold Roberts, Westboro, Mass.

[73] Assignee: Magnetic Controls Company, Minneapolis, Minn.

[21] Appl. No.: 468,480

[22] Filed: Feb. 22, 1983

Related U.S. Application Data

[63] Continuation-in-part of Ser. No. 444,494, Nov. 24, 1982, Pat. No. 4,611,884.

[51] Int. Cl.[4] .............................................. G02B 7/26
[52] U.S. Cl. ............................. 350/96.20; 350/96.15; 350/96.18
[58] Field of Search ............... 350/96.17, 96.16, 96.18, 350/96.20; 357/30, 72; 250/227

[56] References Cited

U.S. PATENT DOCUMENTS

| | | | |
|---|---|---|---|
| 4,169,656 | 10/1979 | Hodge | 350/96.15 |
| 4,197,007 | 4/1980 | Costa et al. | 356/73.1 |
| 4,278,323 | 7/1981 | Waldman | 350/96.20 |
| 4,279,465 | 7/1981 | Vojvodich | 350/96.20 |
| 4,314,740 | 2/1982 | Bickel | 350/96.15 |
| 4,327,963 | 5/1982 | Khoe et al. | 350/96.18 |
| 4,329,017 | 5/1982 | Kapany et al. | 350/96.15 |
| 4,360,248 | 11/1982 | Bickel et al. | 350/96.16 |
| 4,420,219 | 12/1983 | Muchel | 350/96.18 |
| 4,422,714 | 12/1983 | Benoit et al. | 350/96.15 |
| 4,423,922 | 1/1984 | Porter | 350/96.15 |
| 4,441,784 | 4/1984 | Korth | 350/96.15 |

FOREIGN PATENT DOCUMENTS 56-809 7/1981 Japan ............................. 350/96.15

OTHER PUBLICATIONS

Shekita, *IBM Technical Disclosure Bulletin*, vol. 25, No. 8, "Fiber-Optic Connector With Inherent Wrap Capability", pp. 4095-4096.
Archey et al., *IBM Technical Disclosure Bulletin*, vol. 22, No. 12, "Low Loss Optical Coupler", pp. 5288-5290.

*Primary Examiner*—William L. Sikes
*Assistant Examiner*—Frank González
*Attorney, Agent, or Firm*—Weingarten, Schurgin, Gagnebin & Hayes

[57] ABSTRACT

A coupler for light between the termination of an optical fiber and one or more detector or emitter elements in which the optical path between the termination and the detectors and emitters includes one or more focussing surfaces. The coupler is designed as a molded plastic body adapted to precisely position the optical fiber termination and the emitters and detectors so that the optical path between them via the focussing surfaces couples light efficiently. The focussing surfaces are molded into the coupler during manufacture and are preferably angled to the radiation to provide total internal reflection, avoiding reflective coatings. In the case where the focussing surfaces are reflecting, they are preferably ellipsoidal or paraboloidal in shape. In a second case, one surface is beam splitting and a second surface provides focussed reflection. In another case one focussing surface is reflecting while a second focussing surface is refracting. The coupler permits the realization of various features including precise alignment between the fiber, emitters and detectors; physically separated surfaces; cross-talk elimination; insensitivity to variations in radiation wavelength, index of refraction and dimensions of the coupler; aberration correction; ease of molding without side actions in the mold; and design flexibility in the placement of the focussing surfaces.

26 Claims, 12 Drawing Figures

FIG. 3
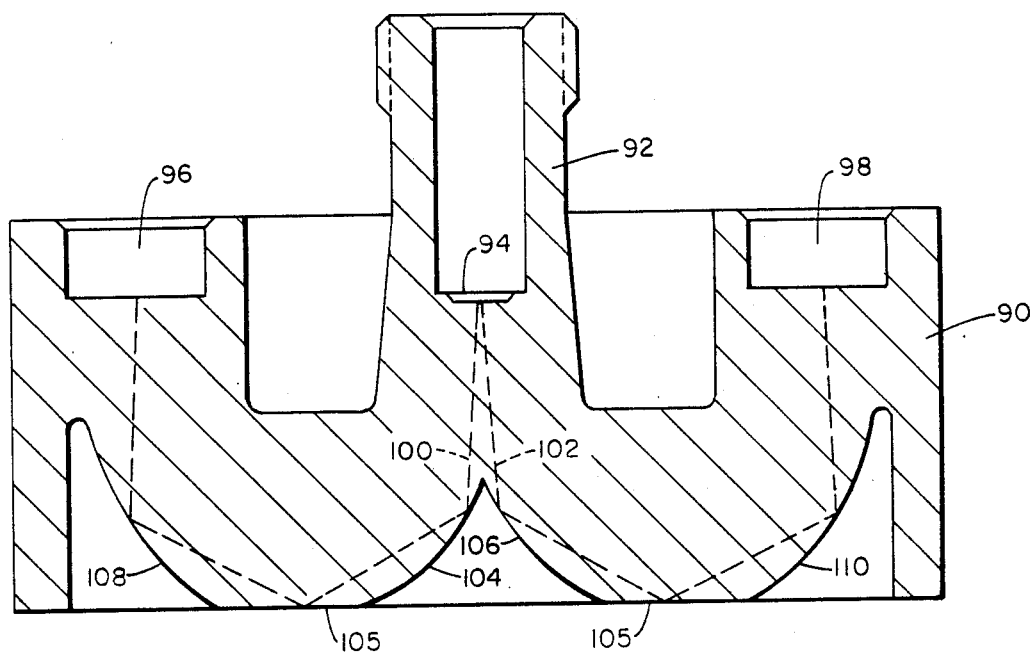
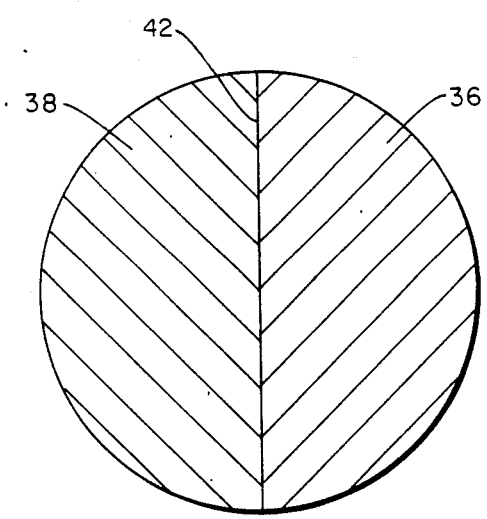
FIG. 4
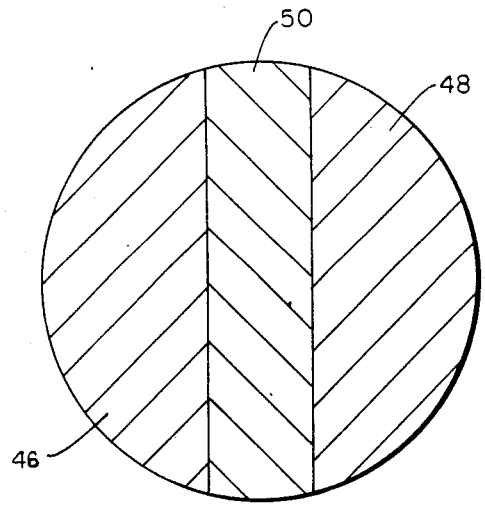
FIG. 5

MONOLITHIC FIBER OPTIC COUPLER HAVING TOTAL INTERNAL REFLECTING SURFACE

This invention is a continuation-in-part of application Ser. No. 444,494 filed on Nov. 24, 1982 (now U.S. Pat. No. 4,611,884 issued on 9/16/86) of the same inventive entity and assignee as the instant invention.

FIELD AND BACKGROUND OF THE INVENTION

Fiber optic couplers are typically used to apply modulated light to an optical fiber from an emitting source and to apply light received from the fiber to a detecting element. Such couplers can also be used to multiplex or demultiplex modulated light carried or to be carried by an optical fiber. See my copending commonly assigned application, Ser. No. 444,494, filed Nov. 24, 1982.

Such couplers are likely to be used in great numbers and it is accordingly desirable that a coupler be capable of high volume, low cost production with a minimum of production steps and reliable construction. Such couplers must also function in environments of varying temperatures and other effects which can impact the optical properties or alignment of the coupler with detrimental effects on the coupling function.

Great positional accuracy is required in the placement of coupler elements to insure low losses in coupling light between fiber terminations and emitters and detectors. Injection molding techniques can be used for this purpose, but often are complicated by the need for side actions to accommodate all the pockets of a coupler mold. A coupler which can avoid side action molds is therefore desirable.

Optical properties which permit focussing, beam splitting or correction of spherical aberration and coma are also desired in the coupler for minimizing losses or providing flexibility in use.

SUMMARY OF THE INVENTION

In accordance with the teaching of the present invention, a coupler is provided in which optical coupling is achieved between the termination of an optical fiber and respective detectors and emitters via one or more focussing surfaces. High positional accuracy and resulting alignment is accomplished by molding the coupler as a single plastic part in which the fiber termination and the emitters and detectors are precisely located by molded in cavities. The focussing surfaces that guide the radiation between the termination and the emitters and detectors are also molded as pockets in the coupler body. In a single injection molding step, all critical components of the coupler body are formed, thus insuring accurate and repeatable coupler reproduction at low cost.

In one preferred embodiment of the invention, the coupler focussing surfaces are reflective, operating on the principle of total internal reflection without reflective coatings. These surfaces may be aspheric or spherical in shape depending upon the desire to correct for spherical aberration and coma or achieve flexibility in the location of the focussing surfaces. Molds for either shape are nearly the same in cost. Side action molds may be eliminated by the placement of all component cavities on opposite sides of the coupler body. The focussing surfaces are segmented where it is desired to completely isolate the radiation paths between the fiber termination and the emitters and detectors. Where reflecting surfaces are used, the coupler is insensitive to changes in refractive index and dimensions attributed to temperature or other effects and to wavelength changes.

In another preferred embodiment the coupler contains a groove that terminates in a beam splitting surface. The groove is adapted to receive and position an optical fiber with its termination proximate to the beam splitting surface. One radiation path leads from the termination to a cavity for an emitter or detector by reflection at the beam splitting surface. The other path leads through the beam splitting surface to an emitter or detector cavity by total internal reflection from a focussing, molded-in surface. Side actions are avoided in the coupler mold according to this embodiment.

In another embodiment of the invention, one focussing surface is reflecting while a second focussing surface is refracting.

DESCRIPTION OF THE DRAWING

These and other features of the present invention are more fully described below in the solely exemplary detailed description and accompanying drawing of which:

FIG. 3 is a cross sectional view of a coupler alternative to that of FIG. 1 using paraboloidal total internal reflecting surfaces and produced by a mold requiring no side actions;

FIG. 4 is a face-on view of the reflecting surfaces of FIGS. 1, 2, or 3;

FIG. 5 is a face-on view of an alternative form for the reflecting surfaces of FIGS. 1, 2, or 3;

DETAILED DESCRIPTION OF THE INVENTION

The present invention contemplates a fiber optic coupler in which at least two optical surfaces, which may be either reflecting or refracting, define physically separated light paths between the termination of an optical fiber and active elements such as an emitter or a detector. The reflecting or refracting surfaces of the coupler are typically formed as interfaces between the air and a plastic material forming the coupler body.

Figure 1:
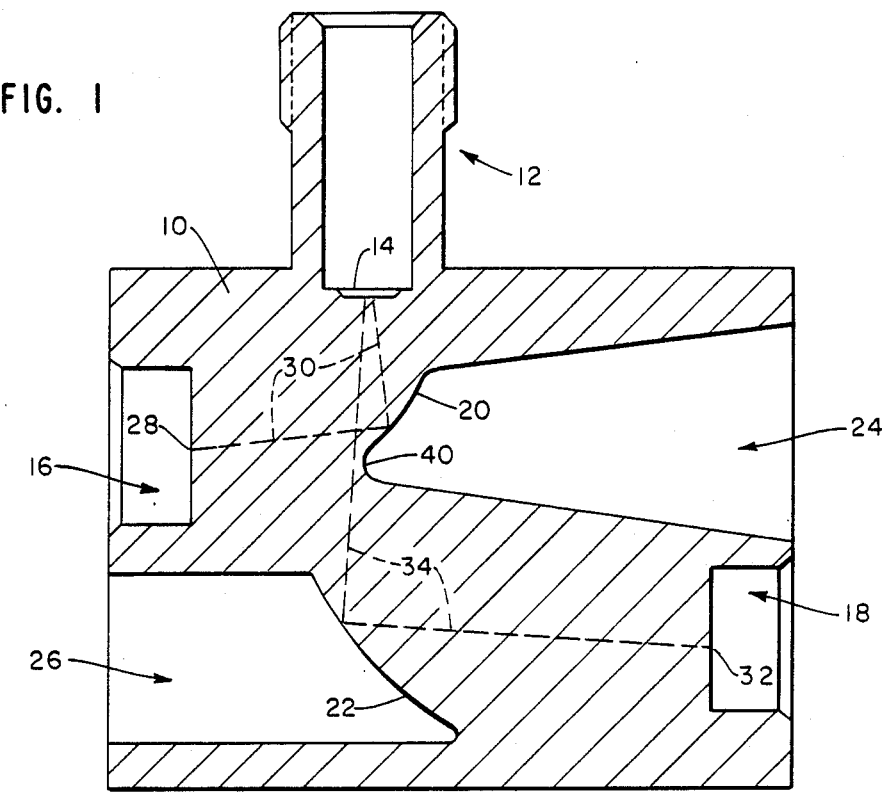
FIG. 1 is a cross sectional view of a coupler according to the invention having total internal reflecting ellipsoidal surfaces.

In accordance with the first embodiment of the invention illustrated in FIG. 1, a coupler body 10 has an attachment port 12 for securing an optical fiber and connector so as to locate the fiber termination at an interface 14 with the molded plastic of the body 10. The body 10 includes cavities 16 and 18 dimensioned to receive and accurately align emitters or detectors, preferably, in a typical application, one of each. The type of emitter or detector utilized in the present invention includes a centered emitting or sensing locus. An optical path between the center of the cavities 16 and 18 and the termination of the optical fiber at the interface 14 is provided by ellipsoidal surfaces 20 and 22 respectively. These surfaces are angled at or above the critical angle to provide total internal reflection and avoid the need for reflective coatings while providing 100% reflection by contrast to mirror surfaces. The ellipsoidal surfaces 20 and 22 are molded into the body 10 as terminates of cavities 24 and 26 respectively. Such aspheric surfaces eliminate spherical aberrations. In the case of the ellipsoidal surface 20 its shape is dimensioned so that one focus of the ellipsoid lies at the location of a point 28 centered within the cavity 16 at the location where light is applied or responded to by the emitter or detector inserted therein. The other focus for the ellipsoidal surface 20 coincides with the location of the optical fiber termination at the interface 14. A light path 30 is accordingly defined therebetween. The ellipsoidal surface 22 is dimensioned so that one focus of the solid ellipsoid lies at a point 32, having the same properties with respect to the cavity 18 that the point 28 has for the cavity 16. The other focus of the solid ellipsoid of the surface 22 is located at the point where the fiber terminates at the interface 14 defining an optical path 34 between the point 32 and interface 14. If the optical surfaces 20 and 22 are viewed face-on from the location of the interface 14 they will appear generally as respective segments 36 and 38 in FIG. 4. The location of the inner most termination 40 of the cavity 24 can be varied to affect the location of dividing line 42 between the segments 36 and 38 and correspondingly adjusting the percentage of radiation carried by the respective paths 30 and 34. In typical application that percentage 50% to each path.

The cavities 24 and 26 may be rotated about the axis of port 12 to positions 90° apart if it is desired to eliminate light travelling between the points 28 and 32 to reduce the transmission of spurious radiation therebetween. The surfaces 20 or 22 or both may be segmented in order to provide cross talk isolation between radiation applied to or received at the cavities 16 and 18 due to reflection at interface 14. Such segmentation is illustrated in FIG. 5, a face-on view of the surfaces 20 and 22 from the interface 14. As seen from that location, the surface 22 occupies left and right hand portions 46 and 48 of the field of view of FIG. 5 while the surface 20 comprises a narrow finger extending from top to bottom in the view of FIG. 5 as a central portion 50.

The material for the coupler body 10 is typically a transparent injection moldable plastic such as LEXAN, a trademark of the General Electric Company. In general transparent acrylic or polycarbonate plastics have been found of particular usefulness. Injection molding techniques for the production of internal cavity surfaces within a body 10 are available in the art. Several companies have the ability to mold plastic lenses or other optical shapes and can be used to produce such couplers.

Figure 2:
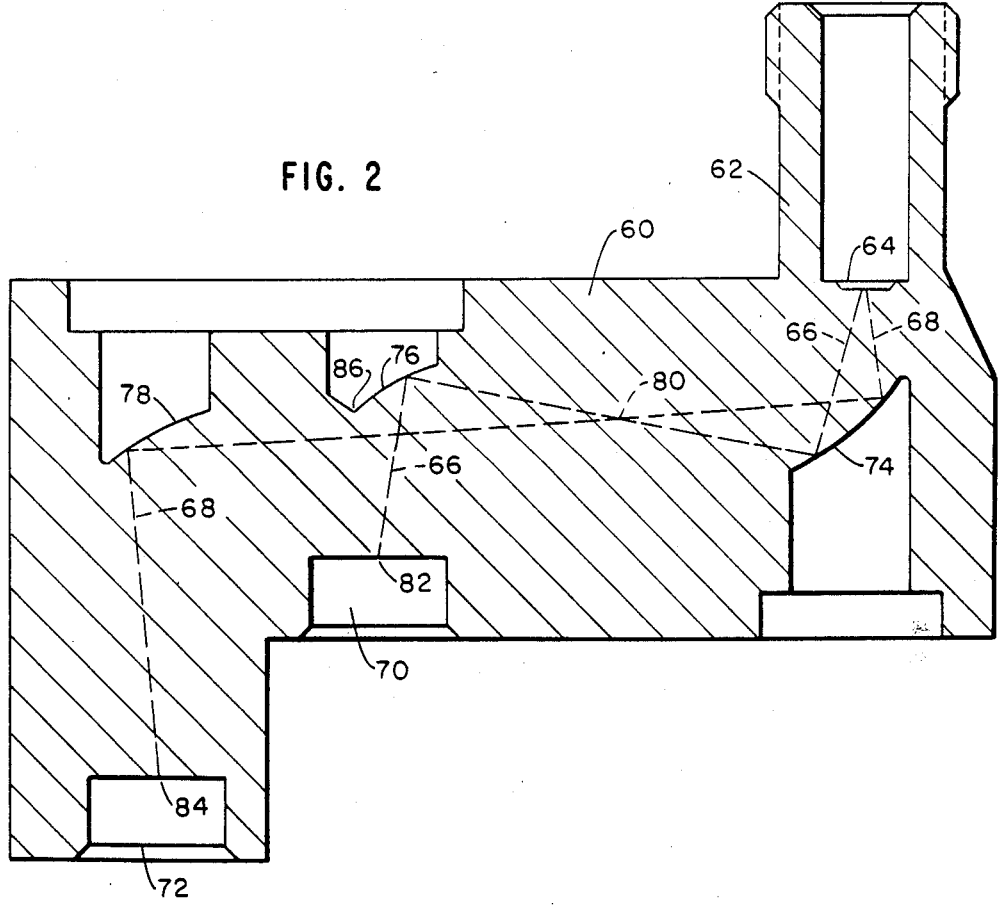
FIG. 2 is a cross sectional view of a coupler alternative to that of FIG. 1 using ellipsoidal total internal reflecting surfaces and produced by a mold requiring no side actions.

An alternative embodiment of a molded plastic coupler body 60 is illustrated in FIG. 2. The coupler body 60 includes a fitting 62 for securing an optical fiber and connector to present the fiber termination centered at an interface 64. Respective optical paths 66 and 68 are defined between the center of the interface 64 at the fiber termination and the center of emitter or detector cavities 70 and 72 respectively. The paths 66 and 68 are completed by ellipsoidal, total internal reflecting surfaces 74, 76, and 78. The ellipsoids of the surfaces 74, 76, and 78 share a common focus at a point 80 while the other focus of the surface 74 is at the fiber termination at interface 64. The surfaces 76 and 78 have their other focus at respective points 82 and 84, centered within the cavities 70 and 72 respectively, where light may be applied to or received from emitters or detectors inserted within those cavities. The surfaces 76 and 78 are midway between point 80 and respective points 82 and 84.

The mold for the body 60, requires no side action since all of the cavities are provided from facing opposite top or bottom surfaces. This is of substantial advantage in lessening the cost and increasing the precision of injection molding of such couplers.

The innermost termination of the cavity forming the surface 76, at a point 86, defines the percentage of radiation shared between the paths 66 and 68, typically in accordance with the face-on view illustrated in FIG. 4. Segmentation of the reflecting surfaces can also be achieved in accordance with the pattern illustrated in FIG. 5, or other patterns as desired.

Because each of the optical paths 66 and 68 includes reflections from two oppositely directed, ellipsoidal surfaces, it is possible to make the focussing function of the reflecting surfaces in each path corrected for coma and spherical aberration.

A third embodiment utilizing total internal reflecting, focussing surfaces in the optical paths between an optical fiber termination and emitter and detector cavities is illustrated in FIG. 3. As shown there a coupler body 90 has a fixture 92 for securing an optical fiber through its encasing cable and connector to the body 90 so as to position the fiber termination centrally at an interface 94 with the plastic of the coupler body 90. First and second cavities 96 and 98 are provided within the body 90 to either side of the fixture 92 to accommodate emitters or detectors as desired. Optical paths 100 and 102 between the cavities 96 and 98 are provided by collimating total internal reflecting, paraboloids 104 and 106 respectively, end surface 105 and paraboloidal, focussing total internal reflecting surfaces 108 and 110 respectively. Because of the focussing nature of the paraboloidal reflectors 108 and 110, their placement is not critical and they can be located at any distance from the fiber termination interface 94 as desired. Splitting of the field of view from the interface 94 provided by the surfaces 104 and 106 can also be tailored as discussed above with respect to FIGS. 4 and 5.

The mold for the body 90 also does not require side actions. The molding of a coupler according to the embodiment of FIG. 3 can therefore be provided in a highly efficient manner. The couplers of FIGS. 1–3 by being of all reflecting surfaces are insensitive to changes in refractive index, dimensions and wavelengths.

Figure 6B:
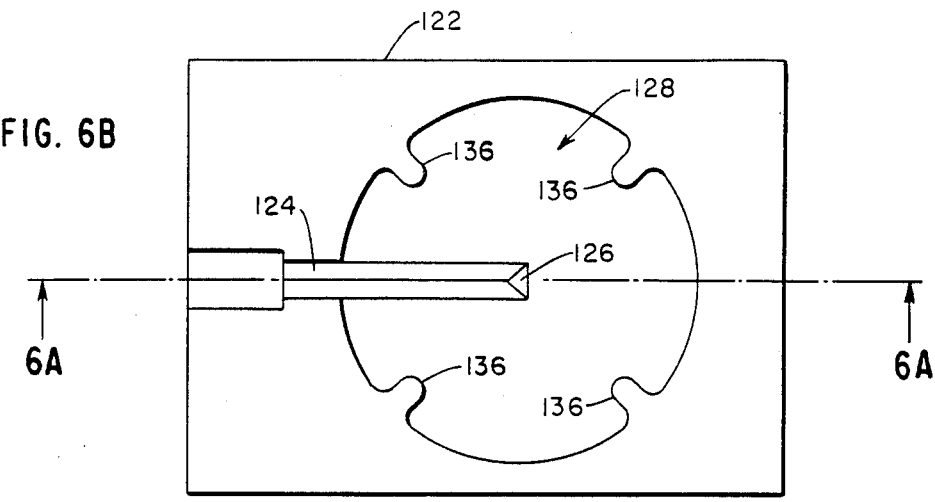
FIGS. 6A and 6B are respectively cross sectional and top views of a coupler according to a second preferred embodiment of the invention and having a beam splitting surface and total internal reflecting and focussing surface for accomplishing a coupling function.
Figure 6A:
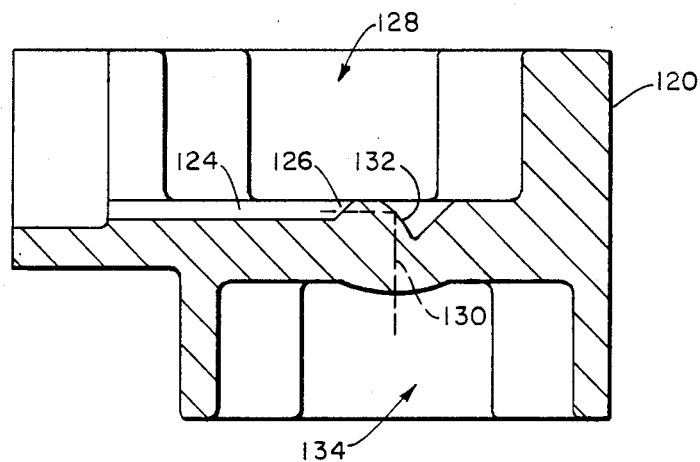

FIGS. 6A and 6B illustrate a second general embodiment of the present invention in which a beam splitting surface is used to direct radiation between an optical fiber termination and the location of emitter or detector cavities. A coupler body 120 is shown sectionally in FIG. 6A while FIG. 6B shows a top surface 122. The coupler body 120 includes a groove 124 in which an optical fiber alone is typically cemented with its termination placed adjacent to a dielectric coated, beam splitting surface 126. A first cavity 128 is centered directly adjacent the surface 126 and opens on the surface 122, for positioning an emitter (or detector) so that radiation can be applied to or received from the fiber termination by reflection from the surface 126. The portion of the radiation transmitted through the surface 126 by the beam splitting function imparted by the dielectric coating, forms an optical path 130 that includes total internal reflections from a focussing surface 132 which redirects the path 130 toward the center of a cavity 134 for holding a detector (or emitter) element.

The coupler of FIGS. 6A and 6B is capable of injection molding without side actions to the mold. The fiber termination can be coupled to the surface 126 through index of refraction matching material or not as desired. The embodiment of FIGS. 6A and 6B provides particularly efficient coupling from an emitter located within the cavity 128, as well as to the cavity 134, typically used for a detector.

The cavity 128 as well as the cavity 134 includes indents 136 which provide for precise positioning of the emitter or detector housing.

Figure 7:
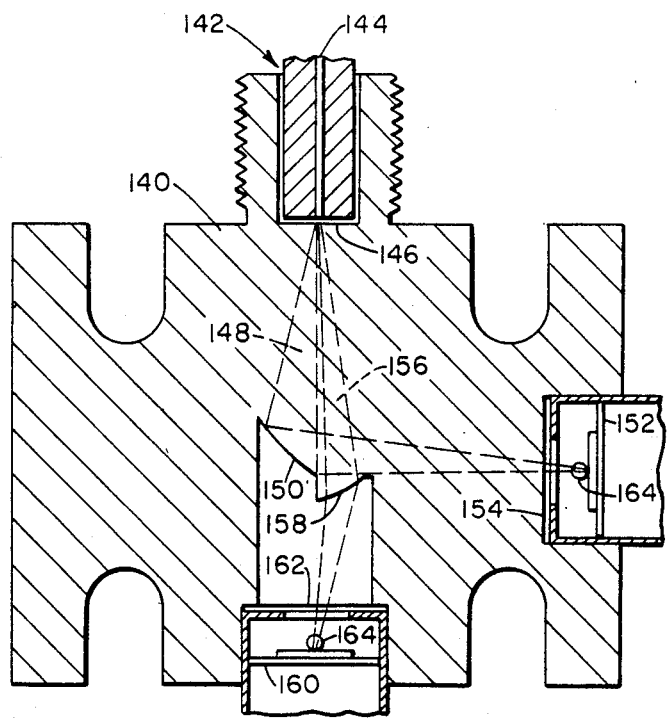
FIG. 7 is a cross sectional view of a coupler according to another embodiment of the invention and having a refractive, focussing surface and a total internal reflecting, focussing surface for accomplishing a coupling function.

FIG. 7 illustrates a third general embodiment of the present invention. As shown there, a coupler body 140 has a coupling 142 which accepts an optical fiber 144 within a connector to position the termination of the fiber 144 against an interface 146 with the body 140. One optical path 148 is provided from the termination of the fiber 144 through a total internal reflecting surface 150 to a detector or an emitter assembly 152 within a cavity 154. A second optical path 156 leads from the termination of the fiber 144 through a refracting surface 158 to an emitter or detector assembly 160 within a second cavity 162 of the coupler 140.

In the illustration of FIG. 7, the detectors and emitters are shown of the focussing type utilizing lenses 164 to image or direct light from a semiconductor sensing or emitting element. It is to be understood that other forms of detectors and emitters may be used here or elsewhere in the invention as desired.

Figure 8:
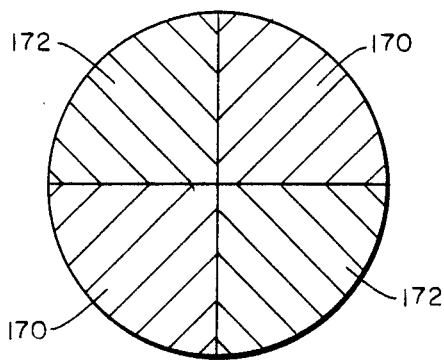
FIG. 8 is a face-on view of an alternative focussing surface for use with one or more of the couplers of the invention.
Figure 9:
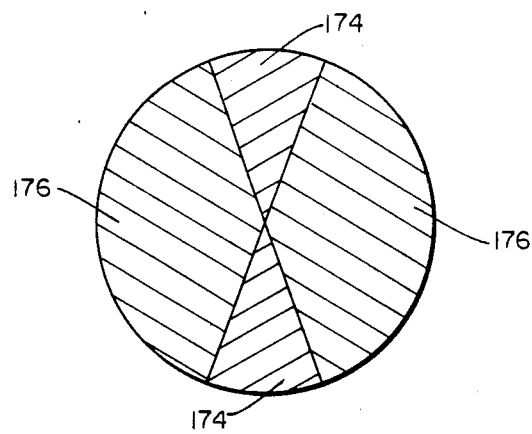
FIG. 9 is a face-on view of an alternative focussing surface for use with one or more of the couplers of the invention.

The surfaces 150 and 158 as viewed from the termination of the fiber 144 may have the character as described above with respect to FIGS. 4 and 5. Alternatively the surfaces 150 and 158 may be segmented as illustrated in FIG. 8 with sections 170 corresponding to one of the surfaces 150 and 158 and opposite sections 172 corresponding to the other of the surfaces 150 and 158. Similarly in FIG. 9 segments 174 and 176 illustrate a pattern for the surfaces 150 and 158, or extensions thereof as appropriate to form the indicated segments. Such segmented reflecting and refracting surfaces are useful in avoiding reflections back from the interface 146 into the opposite cavity and thereby reducing cross talk.

Figure 10B:
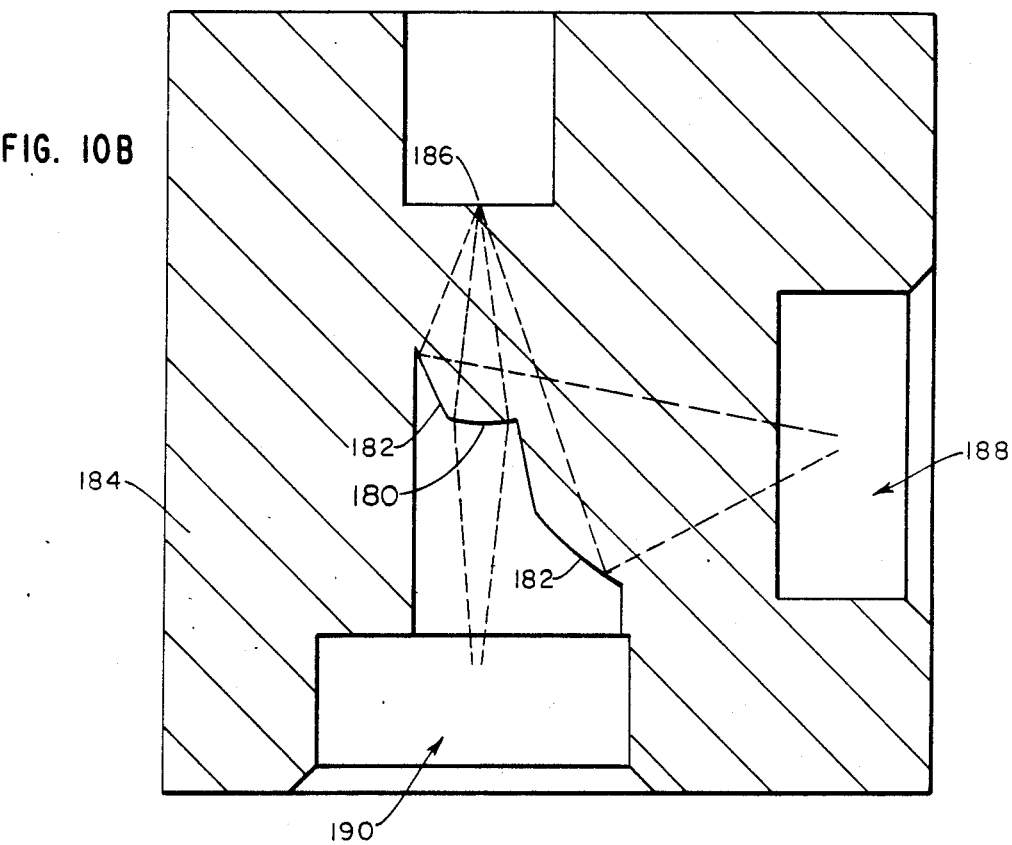
FIGS. 10A and 10B are respectively face-on and sectional views of an alternative coupler having one refracting, focussing surface and one total internal reflecting, focussing surface according to the invention.
Figure 10A:
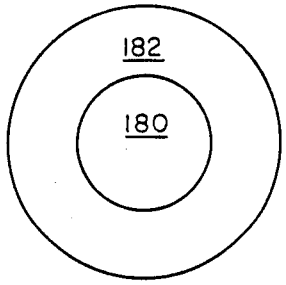

In FIGS. 10A and 10B there is illustrated an alternative form to the embodiment of FIG. 7 in which the reflecting and refracting functions are divided between concentric surfaces 180 and 182 within a coupler body 184. FIG. 10B illustrates the portion of the coupler containing reflecting and refracting surfaces 182 and 180 for reflective and refractive paths between a fiber termination 186 and cavities 188 and 190 respectively for emitters or detectors. FIG. 10A is a substantially face-on view of those surfaces.

The alternative form illustrated by FIGS. 10A and 10B similarly prevents cross talks between the emitter and detector elements from reflections at the interface with the optical fiber.

Index matching material at the fiber terminations may be used as an alternative for the prevention of cross talk in all the above described embodiments.

The reflecting surfaces 150 and 182 in FIGS. 7 and 10A and 10B respectively are typically ellipsoidal as above with the two focuses respectively chosen to lie at the point of the fiber termination and optical center of the detector or emitter cavity. The refracting surfaces 158 and 180 are typically Cartesian Ovoids to eliminate spherical aberrations if desired.

The description above is of a fiber optic coupler utilizing one or more total internal reflecting, focussing surfaces with or without refracting surfaces and capable of being easily molded using injection molding techniques to provide precise optical alignment of fiber terminations with the coupling centers to emitter and detector elements. The examples given above are exemplary only of the invention the scope of which is solely as indicated in the following claims.

What is claimed is:

1. An optical coupler for an optical fiber termination; comprising:
    a monolithic coupler body of an optically transparent material;
    said monolithic coupler body having a first cavity integrally formed therein for receiving an element for emitting optical radiation into said coupler body;
    said monolithic coupler body having a second cavity integrally formed therein for receiving means for receiving optical radiation from within said monolithic coupler body;
    said monolithic coupler body having an integral means for positioning said optical fiber termination and defining an optical fiber communication path along a first axis within said coupler body;
    first means integrally formed within said monolithic coupler body including a first optical surface along said axis, said surface being an integral part of said monolithic coupler body for providing a first optical path distinct in part and common in part with said axis between said integral means for positioning and said first cavity of said monolithic coupler body; and
    second means integrally formed within said monolithic coupler body including a total internal reflecting second optical surface along said axis and being an integral part of said monolithic coupler body that is physically separated from said first optical surface for providing a second optical path distinct in part and common in part with said axis, entirely within said monolithic coupler body between said integral means for positioning and said second cavity of said monolithic coupler body.

2. The coupler of claim 1 wherein both of said first and second physically separted optical surfaces provide said first and second optical paths by total internal reflection within said monolithic coupler body.

3. The coupler of claim 2 wherein said first and second optical surfaces are paraboloidal.

4. The coupler of claim 2 wherein said first and second optical surfaces are ellipsoidal.

5. The coupler of claim 4 further including:
a third ellipsoidal total internal reflecting surface having one focus common with the ellipsoidal focuses of said first and second optical surfaces and a second focus positioned at said optical fiber termination;
the second focuses of said first and second ellipsoidal optical surfaces being placed at said first and second cavities.

6. The coupler of claim 1 wherein said integral means for positioning an optical fiber termination positions said termination approximate to said beam splitting optical surface.

7. The coupler of claim 6 wherein said first cavity is located to position said element proximate to said beam splitting surface.

8. The coupler of claim 7 wherein said second optical surface is positioned on said second path for radiation transmitted through said beam splitting optical surface to or from said second cavity.

9. The coupler of claim 1 wherein said body is formed of a moldable plastic.

10. The coupler of claim 1 wherein said monolithic coupler body is formed of an acrylic or polycarbonate plastic.

11. The coupler of claim 1 wherein said first and second physically separated optical surfaces, said integral means for positioning an optical fiber termination, and said first and second cavities are integrally formed from opposite surfaces thereof whereby said body may be molded by a mold without side actions.

12. The coupler of claim 1 wherein said first and second physically separated optical surfaces are segmented to avoid cross talk between said first and second optical paths.

13. The coupler of claim 1, wherein said first optical surface provides the first optical path by beam splitting.

14. The coupler of claim 1, wherein said first optical surface provides the first optical path by refraction.

15. An optical coupler for receiving an optical fiber termination, comprising:
a monolithic coupler body of a light transmissive substance having an outer surface;
said monolithic coupler body having an integral means for positioning an optical fiber termination;
said monolithic coupler body having first and second integral internal cavities for receiving one of a light emitting and a light receiving element each in communication with said outer surface of said monolithic coupler body;
said monolithic coupler body having a third integral internal cavity in communication with one of said first and said second cavities and defining on an inside third cavity wall first portion a first total internal reflecting surface for providing a first optical path within said coupler between the other one of said cavities and said positioning means and defining on another inside third cavity wall second portion different from and in spaced apart relation to said first portion of said third cavity wall a refracting surface for providing a second optical path within said coupler between said positioning means and the other one of said first and second internal integral cavities.

16. The invention of claim 15, wherein said third cavity wall defining said refracting surface is concentric to said third cavity wall portion defining said totally internally reflecting surface.

17. The invention of claim 15, wherein said reflecting surface is ellipsoidal having one focus aligned with the positioning means and another focus aligned with said one of said first and second cavities.

18. The invention of claim 15, wherein said refracting surface is a cartesian ovoid.

19. An optical coupler for receiving an optic fiber termination comprising:
a monolithic coupler body of a light transmissive substance having an outer surface;
said monolithic coupler body having an integral means for positioning said optical fiber termination;
said monolithic coupler body having first and second integral internal cavities for receiving one of a light emitting and a light receiving element each in communication with said outer surface of said monolithic coupler body;
said monolithic coupler body having a third integral internal cavity in communication with said outer surface and defining on an inside third cavity wall a first ellipsoidal surface having a first focus aligned with said positioning means and a second focus aligned with one of said first and said second cavities;
said monolithic coupler body having a fourth integral internal cavity in communication with said outer surface and defining on an inside fourth cavity wall a second ellipsoidal surface having a third focus aligned with said positioning means and a fourth focus aligned with the other one of said first and said second cavities; and
whereby said first and said second foci of said first ellipsoidal surface provide a first total internal reflecting optical path between said positioning means and one of said cavities and said third and said fourth foci of said second ellipsoidal surface provide a second total internal relfecting optical path between said positioning means and said other one of said optical cavities.

20. The invention of claim 19, wherein said first and said second cavities are in communication with different sides of said surface of said monolithic coupler boyd.

21. A monolithic coupler body for an optical fiber termination, comprising:
a monolithic coupler body of a light transmissive substance having an outer surface;
said monolithic coupler body having an integral means for positioning an optical fiber termination;
said monolithic coupler body having first and second integral and internal cavities for receiving one of a light emitting and a light receiving element each in communication with said outer surface of said monolithic coupler body and on the same side thereof;
said monolithic coupler body having third, fourth, and fifth integral internal cavities in communication with opposing sides of said outer surface of said monolithic coupler body and defining on an inside third cavity wall a first ellipsoidal total internal reflecting surface having a first focus aligned with said positioning means and a second focus spaced therefrom and positioned within said monolithic coupler body, defining on an inside fourth cavity wall a second ellipsoidal total internal reflecting surface having a third focus aligned with one of said first and said second cavities and a fourth focus aligned with said second focus, and defining on an inside fifth cavity wall a third ellipsoidal total internal reflecting surface having a fifth focus aligned with the other one of said first and said second cavities and a sixth focus aligned with said second and said fourth foci;

whereby optical paths are defined between said optical fiber termination and respective ones of said first and said second cavities via said third cavity and respective ones of said fourth and said fifth cavities in a manner requiring no side action during coupler formation since all of said cavities are provided on opposing surfaces of said monolithic coupler body.

22. An optical coupler for an optical fiber termination, comprising:

a monolithic coupler body of a light transmissive substance having an outer surface;

said monolithic coupler body having integral means for positioning an optical fiber terination;

said monolithic coupler body having first and second integral internal spaced-apart cavities for receiving one of a light emitting and a light receiving element each in communication with said outer surface of said monolithic coupler body and on the same side thereof;

said monolithic coupler body having a third internal integral cavity in communication with said outer surface and formed on a side thereof confronting said side on which said first and said second cavities are integrally formed and axially aligned with said positioning means and defining on inside third cavity walls first and second collimating, total internal reflecting paraboloidal surfaces;

said monolithic coupler body having fourth and fifth internal integral cavities in communication with said outer surface and formed on the same side as said third cavity and spaced to either side thereof and defining on an inside fourth cavity wall a third total internal reflecting paraboloidal surface and defining on an inside fifth cavity wall a fourth total internal reflecting paraboloidal surface such that said first surface confronts said third surface and second surface confronts said fourth surface;

said monolithic coupler body further having end walls formed on said side thereof confronting said side on which said first and second cavities are integrally formed and intermediate said first and said third and said second and said fourth surfaces in such a way that one of said end walls and said first and said third surfaces define a first optical path between said positioning means and one of said first and second cavities and the other one of said end walls and said second and said fourth surfaces define a second optical path between said positioning means and the other one of said first and second cavities.

23. An optical coupler for an optical fiber termination, comprising:

a monolithic coupler body of a light transmissive substance having an outer surface;

said monolithic coupler body having integral optical fiber positioning means for receiving an optical fiber including a beam splitting interface that is an integral part of said monolithic coupler body adjacent and in spaced relation to an optical fiber termination when an optical fiber is positioned in the optical fiber positioning means, for beam splitting interface providing first and second optical paths;

said monolithic coupler body including an integral light emitter receiving cavity in communication with one surface of said outer surface of said monolithic coupler body and along one of said first and second optical paths;

said monolithic coupler body including a light detector receiving cavity integrally formed with said coupler and in communication with a surface of said outer surface of said body confronting said surface in communication with said light emitter receiving cavity; and said monolithic coupler body including an integral internal cavity having a cavity wall defining a total internal reflecting surface that is an integral part of said monolithic coupler body in physically spaced relationship to said beam splitting surface and along said second optical path for providing a third optical path between said total internal reflecting surface and the other one of said first and second cavities wholly within said monolithic coupler body.

24. An optical coupler for an optical fiber termination; comprising:

a monolithic coupler body of an optically transparent material;

said monolithic coupler body having a first cavity integrally formed therein for receiving a first semiconductor optical transducer into said coupler body;

said monolithic coupler body having a second cavity integrally formed therein for receiving a second semiconductor optical transducer within said monolithic coupler body;

said monolithic coupler body having an integral means for positioning said optical fiber termination and defining an optical fiber communication path along an axis within said coupler body first means integrally formed within said monolithic coupler body including a first optical surface along said axis, said surface being an integral part of said monolithic coupler body for providing a first optical path distinct in part and common in part with said axis between said integral positioning means and said first integral cavity of said monolithic coupler body; and· second means integrally formed within said monolithic coupler body including a total internal reflecting second optical surface along said axis and being another integral part of said monolithic coupler body physically separated from said first optical surface for providing a second optical path distinct in part and common in part with said axis, entirely within said monolithic coupler body between said position means and said second integral cavity of said monolithic coupler body.

25. A component for coupling transmitting or receiving devices to transmit optical radiation between them, said component comprising a body integrally molded, said body having portions of its surface defining at least first and second recesses each of which is shaped to facilitate receipt of an optical device so that it faces the interior of said body, said first and second recesses being located adjacent one another on said body and located along a pair of offset parallel axes which extend through said body, said body further including additional portions which define one pair of spaced apart curved surfaces which face one another and where each of said curved surfaces is located, respectively, along one of said offset axes and also faces, respectively, one of said first and second recesses, said curved surfaces being shaped to operate by total internal reflection to optically couple said first and second recesses along a first optical path which is folded and along which optical radiation can be transmitted between said first and second recesses, wherein further portions of said body define a third recess, adjacent said first and second recesses, for facilitating receipt of an optical device and a second pair of curved surfaces which operate by total internal reflection to define a second folded optical path between said third recess and one of said first and second recesses.

26. The component of claim 25 wherein the first and second recesses and the first and third recesses are each separated by an additional recess.

* * * * *